Oct. 15, 1957     A. M. MARROSU ET AL     2,810,121
VEHICLE SIGNAL
Filed Sept. 30, 1955     2 Sheets-Sheet 1
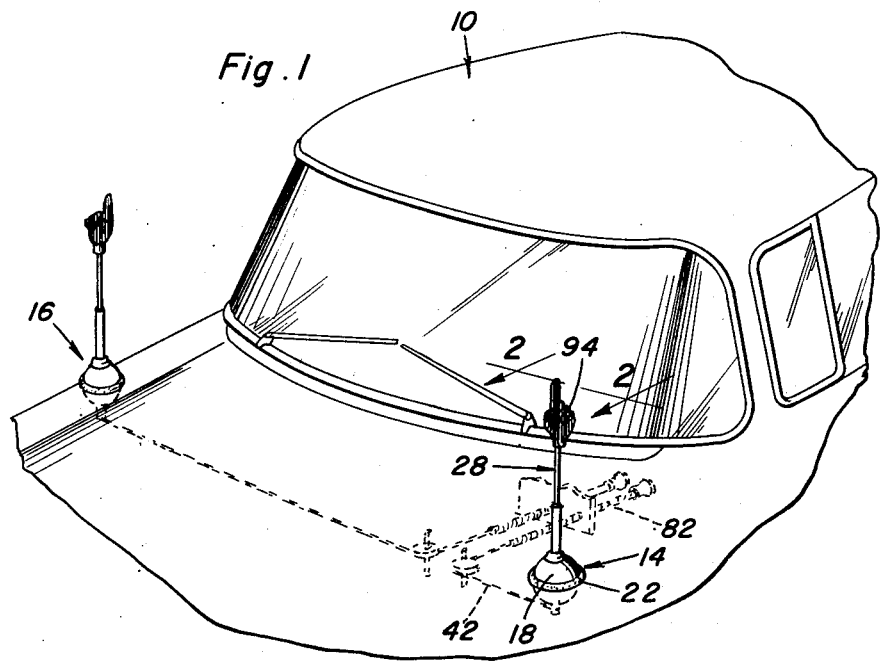
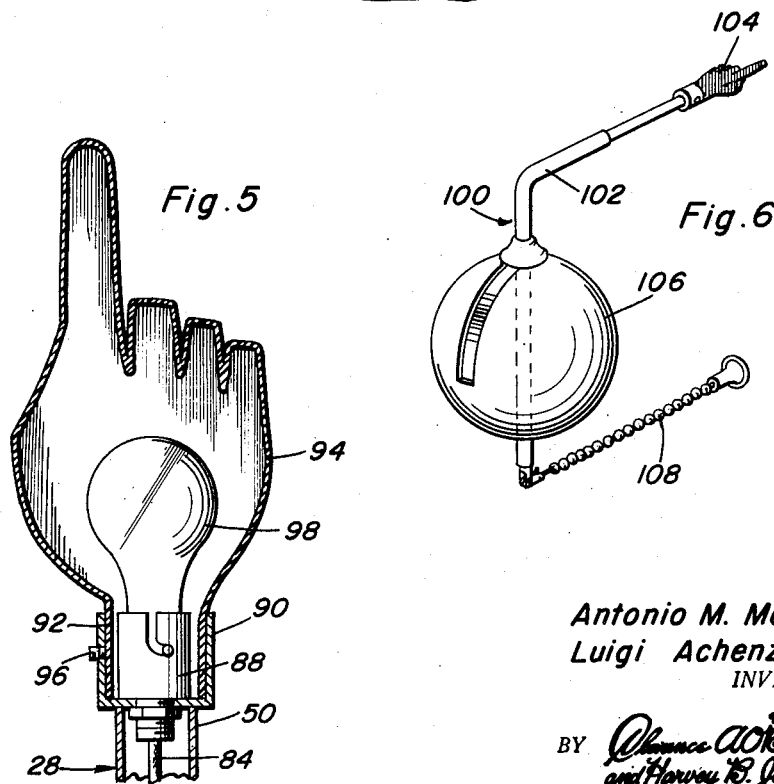
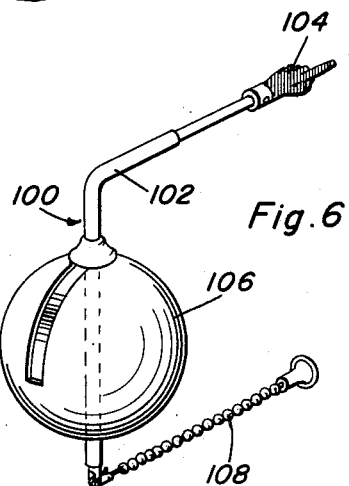
Antonio M. Marrosu
Luigi Achenza
        INVENTORS
BY
                Attorneys

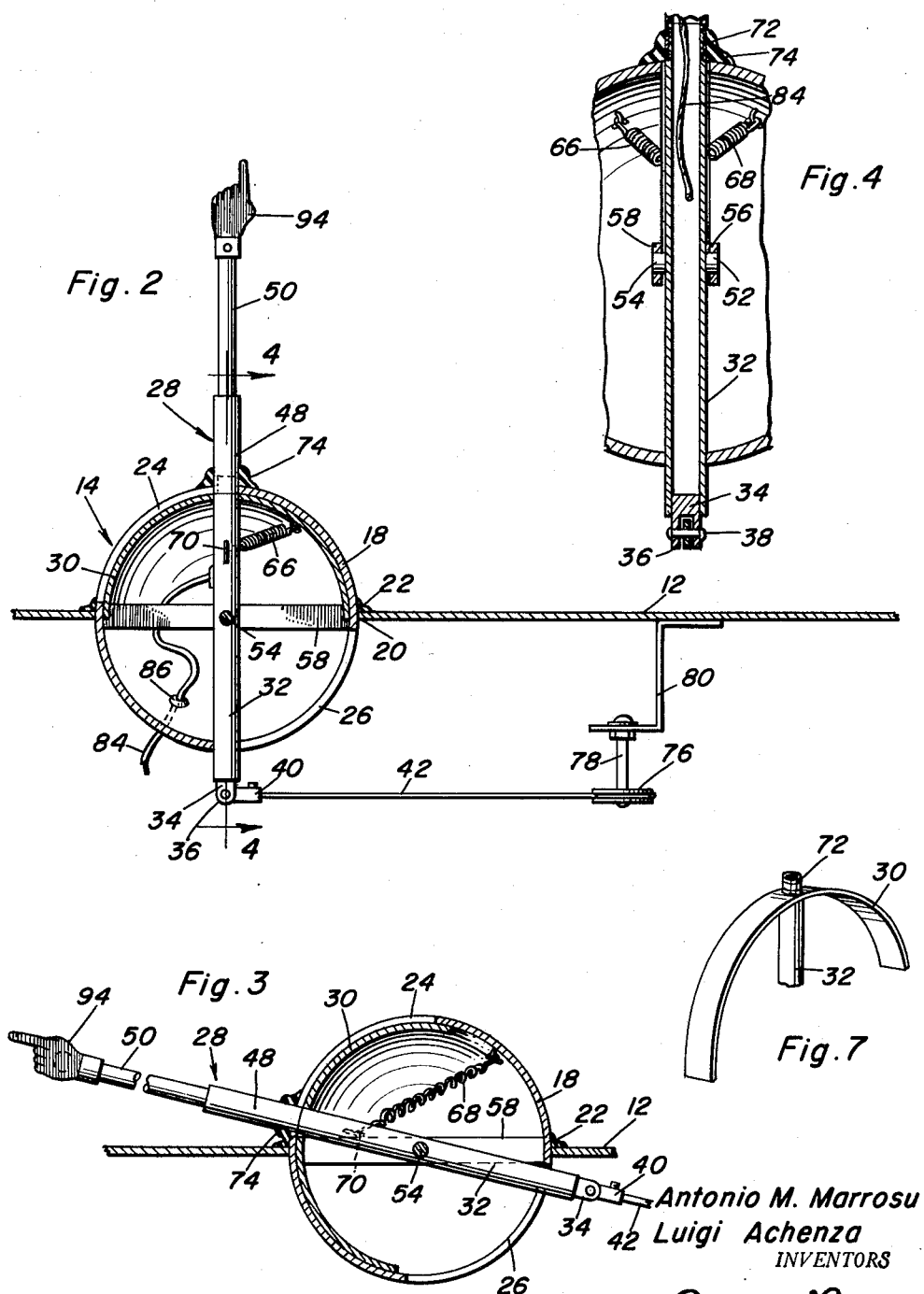

United States Patent Office 2,810,121
Patented Oct. 15, 1957

2,810,121

VEHICLE SIGNAL

Antonio M. Marrosu and Luigi Achenza, Detroit, Mich.

Application September 30, 1955, Serial No. 537,658

4 Claims. (Cl. 340—142)

This invention relates to signal devices and particularly to turn signals for automotive vehicles.

An object of this invention is to provide a signal device for an automotive vehicle, said device being ornamental and attractive and possessing structural improvements in the organization of parts, these structural improvements involving a multisection arm on which a direction pointing device is mounted, this arm being capable of pivotal movement, which movement is constrained to oscillation in one plane.

A further object of this invention is to provide a turn signal device which forewarns of the automotive vehicle operator's intentions to turn, thereby functioning as a safety device both for the vehicle operator and traffic, either automotive or pedestrian.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary perspective view of a vehicle with the invention applied thereto;

Figure 2 is a fragmentary sectional view of a part of the vehicle showing the invention embodiment thereon and taken generally on the plane of line 2—2 of Figure 1;

Figure 3 is a fragmentary sectional view of the structure in Figure 2 showing the same in a different position;

Figure 4 is a sectional view in an enlarged scale taken substantially on the plane of line 4—4 of Figure 2;

Figure 5 is an enlarged fragmentary sectional view showing the pointer construction at the upper end of the signal device;

Figure 6 is a perspective view of a modified form of the invention; and

Figure 7 is a perspective view of a part of the mounting mechanism for the signal arm and constitutes a portion of both the embodiments of Figures 2 and 6.

In the accompanying drawings, Figures 1–5 and 7 illustrate one embodiment of the invention. It is applied to a vehicle 10 having a structural part 12, as the fender or body, accommodating signal devices 14 and 16, each being identical in construction and function. One is mounted on the left side of the vehicle 10, while the other is mounted on the right side in order to form a symmetrical appearance and also in order to signal from the right and left sides.

Signal device 14 consists of a spherical housing 18 mounted and secured in an opening 20 provided in the structural part 12 of the vehicle. A molding 22 which is ornamental in appearance and functions as a gasket is mounted around the circumference of the spherical housing 18 on the surface of the vehicle part 12. Opposed slots 24 and 26 are formed in the spherical housing 18 and constitute guideways for the arm 28 which extends therethrough. Slot 24 is located above the vehicle part 12 and in the upper half of the spherical housing 18. Slot 22 is disposed below the vehicle part 12 and in the lower half of the spherical housing 18. Accordingly, a closure plate 30 which is approximately semicylindrical is mounted in the upper half of the spherical housing 18 and in sealing relationship to the slot 24. The plate 30 is made sufficiently long so as to always close the slot 24 regardless of the position of the arm 28.

This arm is made of a number of sections releasably connected together so that if one of them becomes damaged, it may be removed and replaced. The lower section 32 of the arm 28 is hollow and tubular, having in its lower end a plug 34 held in place by friction or threaded. This plug has one or more ears 36 extending therefrom, and a pivot pin 38 passed therethrough. This pivot pin also passes through a fitting 40 which is at the end of a cable 42, the latter constituting a portion of the means for operating the arm 28. The upper end of the lower section 32 is threaded to accommodate an intermediate section 48 of the arm 28, and there is a final tubular section 50 fitted in the hollow tubular section 28 and held in place by suitable means, as by being a pressed fit or by being threaded.

Means mounting the arm for pivotal movement on an axis which passes through the center of the sperical housing 28 are attached to the lower section 32 of the arm 28. The preferred means consists of trunnions 52 and 54 which are mounted rotatably in apertures formed in the braces 56 and 58 that extend across the housing 18 on opposite sides of the slots 24 and 26. These braces are spaced sufficiently far apart to permit the plate 30 to slide between them so that they function as guides for the sliding plate 30.

Yielding means opposing the pivotal movement of the arm 28 in one direction are attached to the lower section 32 of the arm and to the interior of the spherical housing 18. The preferred yielding means consists of two springs 66 and 68 which are attached at their outer ends to eyes or other brackets secured to the inner surface of the spherical housing 18 and spaced from each other. The inner ends of the springs are mounted in brackets 70 which are secured to the outer surface of the lower section 32 of the arm 28.

As previously indicated, the intermediate section 48 of the arm 28 is threaded to the upper end of the lower section 32. Also connected to this lower section 32 is the plate 30, it being provided with an aperture through which the threaded nipple 72 extends, the latter being used for connection with intermediate section 48. At the same juncture, there is a gasket 74 of rubber, plastic or other suitable material which is adapted to slide with the arm 28 and over the slot 24.

Although various means may be resorted to for pivotally actuating the arm 28, the mechanical type only has been illustrated. It consists of the cable 42 which is attached to the lower end of the arm 28 and exteriorly of the spherical housing 18. Additionally, a pulley 76 mounted on a spindle 78 that is carried by a mounting bracket 80 guides the cable 42 to the arm 28 and also to means for actuating the cable, for example, the Bowden wire 82 terminating in a push-button in a location accessible to the vehicle operator.

An electrical conductor 84 is passed through a grommet 86 disposed in an opening in the spherical housing 18 near the bottom thereof and enters the arm 28 through a lateral opening in it, terminating in an electrical socket 88 at the upper end of the arm 28. This socket 88 is located in a cup 90 which is fixed to the upper end of arm 28 and there is sufficient clearance between the socket 88 and the inner wall of cup 90 to accommodate ferrule 92 that is formed at the lower end of the transparent pointing device 94. A bayonet slot and pin 96 is used to releasably connecting the pointing device 94 to the cup 90. It is preferred that the pointing device be shaped in the form of a hand with all of the fingers except one closed or clenched.

The electric conductor 84 is connected to a source of current, and there is a switch in the line. In this way, the lamp 98 may be energized at the wheel of the vehicle operator.

In the embodiment of Figure 6, all structure is the same as the embodiment of Figure 2 with the exception of the means for operating the arm 100 and one section of the arm. The section 102 which corresponds to the intermediate section 48 of arm 28 is bent at right angles so that the pointing device 104 may project at right angles to the pointing device of Figure 2. The housing 106 accommodating the arm 100 may be mounted in a different position on the vehicle.

The means for actuating the arm 100 are illustrated as being a chain 108 attached to the lower end of the arm 100 and terminate in a position which is accessible to the vehicle operator. In this instance, the springs within the spherical housing 106 are relied on to return the arm 100 to an initial position.

In operation, after the device is mounted on the vehicle, when a turn is to be made, the vehicle operator actuates the arm. As the arm moves, it moves the sliding plate 30 with it, always maintaining the upper slot of the spherical housing closed. The gasket 74 maintains the slot quite weatherproof. The springs return the arm 28 after it has been actuated to signal an intended turn or stop.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a signal device for vehicles, a housing, said housing having a pair of slots in alignment with each other, an arm mounted for pivotal movement in said housing and extending through both of said slots, a signal at one end of said arm, means connected to the opposite end of said arm and on the exterior of said housing for actuating said arm to move the signal bearing end thereof, means carried by said arm and located within said housing and movable over one of said slots to at all times keep it closed, said means including a plate shaped to conform to the inner surface of said housing, and guides carried by said housing between which said plate is movable.

2. The device of claim 1 wherein there are means mounting said arm for pivotal movement located within said housing and supported by said guides.

3. In a vehicle part which has an aperture, a spherical housing located in said aperture, an arm mounted for pivotal movement in said housing, means for actuating said arm in order to provide a signal, and a slot in said housing through which said arm passes, the improvement comprising a plate in the shape of a segment of a sphere secured to said arm and movable over said slot and located within said housing to retain said slot closed and weatherproof, guides disposed in said housing on which said arm is mounted for pivotal movement and between which said plate is movable, yielding means opposing the pivotal movement of said arm in one direction and returning said arm to an initial position, and a sealing device secured to said arm and operable over said slot.

4. The improvement defined in claim 3 together with a transparent pointing device on said arm and having a cavity therein, a lamp socket carried by the upper end of said arm, means supporting said lamp socket and simultaneously holding said device in encircling relationship to a bulb carried by said socket, and an electrical conductor operatively connected with said socket.

References Cited in the file of this patent
UNITED STATES PATENTS

| | | |
|---|---|---|
| 1,213,282 | Shaw | Jan. 23, 1917 |
| 1,215,037 | Lanehart | Feb. 6, 1917 |
| 1,383,870 | Southwell | July 5, 1921 |
| 1,493,358 | McGlincy | May 6, 1924 |